(12) United States Patent
Pettigrew et al.

(10) Patent No.: US 12,348,812 B2
(45) Date of Patent: Jul. 1, 2025

(54) COLOR MANAGEMENT TECHNOLOGIES IN VIDEO EDITING APPLICATION

(71) Applicant: Apple Inc., Cupertino, CA (US)

(72) Inventors: Daniel Pettigrew, Pacific Palisades, CA (US); Robert J Bell, Los Angeles, CA (US); Peter H Chou, Palo Alto, CA (US); Michael J Garber, Sunnyvale, CA (US); Shaun M Poole, Palo Alto, CA (US)

(73) Assignee: Apple Inc., Cupertino, CA (US)

( * ) Notice: Subject to any disclaimer, the term of this patent is extended or adjusted under 35 U.S.C. 154(b) by 141 days.

(21) Appl. No.: 18/314,104

(22) Filed: May 8, 2023

(65) Prior Publication Data

US 2024/0378767 A1  Nov. 14, 2024

Related U.S. Application Data

(60) Provisional application No. 63/500,897, filed on May 8, 2023.

(51) Int. Cl.

| | |
|---|---|
| *G06T 5/92* | (2024.01) |
| *G06F 3/04847* | (2022.01) |
| *G06F 3/0488* | (2022.01) |
| *G06F 3/04883* | (2022.01) |
| *G06T 5/70* | (2024.01) |
| *G06T 5/73* | (2024.01) |
| *G06T 11/00* | (2006.01) |
| *G06V 10/70* | (2022.01) |
| *G11B 27/031* | (2006.01) |

(Continued)

(52) U.S. Cl.
CPC ..... *H04N 21/4312* (2013.01); *G06F 3/04847* (2013.01); *G06F 3/0488* (2013.01); *G06F 3/04883* (2013.01); *G06T 5/70* (2024.01); *G06T 5/73* (2024.01); *G06T 5/92* (2024.01); *G06T 11/001* (2013.01); *G06V 10/70* (2022.01); *G11B 27/031* (2013.01); *H04N 7/0122* (2013.01); *H04N 21/47217* (2013.01); *G06T 2200/24* (2013.01); *G06T 2207/10016* (2013.01)

(58) Field of Classification Search
CPC .. H04N 21/4312; H04N 7/01222; G06T 5/73; G06T 5/92; G06T 5/70; G06T 2200/24; G06F 3/04847; G06F 3/0488; G06F 3/04883
See application file for complete search history.

(56) References Cited

U.S. PATENT DOCUMENTS

| | | | |
|---|---|---|---|
| 5,521,841 A | 5/1996 | Arman et al. | |
| 5,758,093 A | 5/1998 | Boezeman et al. | |

(Continued)

*Primary Examiner* — Antonio A Caschera
(74) *Attorney, Agent, or Firm* — Invoke

(57) ABSTRACT

A computing device harmonizes output image properties displayed on a graphical user interface (GUI) when a user switches between two or more images of different image formats to display on the GUI. When a user interacts with a user interface to change one or more display properties of an image, a system modifies displayed image properties based on the user's modifications. If the user selects another image with different dynamic range than the first image, the system performs a backend image conversion so that the displayed properties of the second image correspond to the user-selected modifications to the displayed properties of the first image.

20 Claims, 9 Drawing Sheets

(51) Int. Cl.
*H04N 7/01* (2006.01)
*H04N 21/431* (2011.01)
*H04N 21/472* (2011.01)

(56) References Cited

U.S. PATENT DOCUMENTS

| | | | |
|---|---|---|---|
| 5,760,767 A | 6/1998 | Shore et al. | |
| 5,852,435 A | 12/1998 | Vigneaux et al. | |
| 6,332,147 B1 | 12/2001 | Moran et al. | |
| 6,463,444 B1 | 10/2002 | Jain et al. | |
| RE38,401 E | 1/2004 | Goldberg et al. | |
| RE38,609 E | 10/2004 | Chen et al. | |
| 6,807,361 B1 | 10/2004 | Girgensohn et al. | |
| 7,143,362 B2 | 11/2006 | Dieberger et al. | |
| 7,149,974 B2 | 12/2006 | Girgensohn et al. | |
| 7,660,464 B1 * | 2/2010 | Peterson | G06T 5/50 |
| | | | 382/181 |
| 8,745,499 B2 | 6/2014 | Pendergast et al. | |
| 9,600,164 B2 | 3/2017 | Matsuda et al. | |
| 10,497,162 B2 * | 12/2019 | Kunkel | H04N 5/445 |
| 10,937,200 B2 * | 3/2021 | Kumar | G06T 5/92 |
| 11,425,283 B1 | 8/2022 | Thurston et al. | |
| 11,550,452 B1 | 1/2023 | Fortunato | |
| 11,669,567 B2 | 6/2023 | Klein et al. | |
| 11,743,550 B2 * | 8/2023 | Atkins | H04N 21/435 |
| | | | 725/37 |
| 11,749,312 B2 | 9/2023 | Bache et al. | |
| 11,887,630 B2 | 1/2024 | Wu et al. | |
| 2003/0184598 A1 | 10/2003 | Graham | |
| 2003/0189588 A1 | 10/2003 | Girgensohn et al. | |
| 2005/0084232 A1 | 4/2005 | Herberger et al. | |
| 2006/0093309 A1 | 5/2006 | Herberger et al. | |
| 2014/0267094 A1 | 9/2014 | Hwang et al. | |
| 2015/0077338 A1 | 3/2015 | Dai et al. | |
| 2015/0234564 A1 | 8/2015 | Snibbe et al. | |
| 2016/0006979 A1 | 1/2016 | Gilboa-Solomon et al. | |
| 2016/0103830 A1 | 4/2016 | Cheong et al. | |
| 2016/0358631 A1 | 12/2016 | Lee | |
| 2017/0352379 A1 | 12/2017 | Oh et al. | |
| 2017/0364198 A1 | 12/2017 | Yoganandan et al. | |
| 2019/0114485 A1 | 4/2019 | Chan et al. | |
| 2020/0296317 A1 | 9/2020 | Post et al. | |
| 2021/0004131 A1 | 1/2021 | Varshney et al. | |
| 2022/0028427 A1 | 1/2022 | Matsuda et al. | |
| 2022/0327830 A1 | 10/2022 | Chang et al. | |
| 2022/0335720 A1 | 10/2022 | Chang et al. | |
| 2022/0353425 A1 | 11/2022 | Manzari et al. | |
| 2023/0281904 A1 | 9/2023 | Habib et al. | |

\* cited by examiner

COLOR MANAGEMENT TECHNOLOGIES IN VIDEO EDITING APPLICATION

INCORPORATION BY REFERENCE; DISCLAIMER

The following application is hereby incorporated by reference: application No. 63/500,897 filed on May 8, 2023. The Applicant hereby rescinds any disclaimer of claim scope in the parent application(s) or the prosecution history thereof and advises the USPTO that the claims in this application may be broader than any claim in the parent application(s).

A portion of the disclosure of this patent document contains material which is subject to (copyright or mask work) protection. The (copyright or mask work) owner has no objection to the facsimile reproduction by anyone of the patent document or the patent disclosure, as it appears in the Patent and Trademark Office patent file or records, but otherwise reserves all (copyright or mask work) rights whatsoever.

TECHNICAL FIELD

The disclosure generally relates to managing brightness and color values for images of different format types.

BACKGROUND

Image and video editing applications allow users to adjust characteristics of images and save the modified images. Users may edit multiple different images characterized by different dynamic ranges. For example, a user may edit image characteristics of a standard dynamic range (SDR) type image characterized by a maximum brightness of 100 nits and a contrast ratio of 1000:1. The user may then edit an image in an HDR format, with a maximum brightness of 1000 nits and a contrast ratio of 10,000:1. Due to the differences in brightness and contrast ratios, adjusting a user interface element to a particular setting when working with one image format does not yield the same visual result when working with another image format. With each change in image format type, a user has to readjust user interface elements to try to create image displays that appear to have similar characteristics to each other.

Overview

In some implementations, a computing device can harmonize output image properties displayed on a graphical user interface (GUI) when a user switches between two or more images of different image formats to display on the GUI. For example, the system may display a first image with a standard dynamic range (SDR) format. The user interacts with the user interface to change one or more display properties of the first image, such as the brightness, temperature, or highlights in the image. The system modifies the displayed image properties based on the user's modifications. If the user selects a second image with a high dynamic range (HDR) format to display in the user interface, the system performs a backend image conversion so that the displayed properties of the second image correspond to the user-selected modifications to the displayed properties of the first image. Accordingly, images with different source format types corresponding to different dynamic ranges appear to a user to have similar display properties. In addition, the system carries modifications through from one image format to subsequently-displayed images of different image formats.

According to one or more implementations, a system provides a user interface including a slider element to allow a user to select a range of values for image display properties that correspond to positions along a linear range of the slider. Moving the slider to a particular position results in modifying the property, such as by adjusting a brightness of the image, highlights, shadows, or a temperature of the displayed image. If the user selects a new image of a second source format type that has a different dynamic range than the first image, the system applies the adjustments made by the user to the first image using the slider element to the new image. Accordingly, from a user's perspective, a position of a user interface element to modify one image of one format type carries over to modify another image of another image format.

According to one or more implementations, the system converts source images of different formats into a common target format for displaying the images. For example, the system may convert SDR and HDR formatted images, each with different dynamic ranges, into a perceived quantization (PQ) format image characterized by yet another dynamic range. The system may display the source images by converting the source images into display data of the PQ format. Alternatively, the system may select another target format type for displaying images, such as based on a user selection or default image display settings of an image management application. The system performs a backend conversion of images from source formats to a single target format with a different dynamic range than the source formats. On the user interface, the user sees a modification to one image of one format type carried through to another image of another format type. On the backend, the system performs different format conversion operations for the different images to carry modifications to display properties through from one image to the other.

Particular implementations provide at least the following advantages. When a user positions an interface element to modify display characteristics of an image, the system performs backend image data conversion to carry the modification through to images of other source format types. As a result, when switching between source images of different format types, users do not need to try to find a particular configuration of display settings by modifying user interface elements in a GUI to that would result in the images appearing to have similar display characteristics. For example, instead of moving sliders into one set of positions for an SDR image and another set of positions for an HDR image to obtain a similar image brightness and temperature, the system performs a backend conversion to ensure the same set of slider positions provides a similar brightness and temperature across both the SDR image and the HDR image.

One or more implementations convert multiple different source images, corresponding to multiple different source image formats, into a uniform target image format. For example, a user interface may include a region in which icons representing multiple different images and/or videos may be displayed. When the system detects selection of a new image, the system converts the new image into the target image format. In an example embodiment in which the region corresponds to a video timeline, playing the video results in displaying multiple different images, corresponding to multiple different source image formats, in a common target image format.

One or more embodiments harmonize display properties for different components within a displayed image. For example, a user may apply a graphic overlay on an image. The graphic overlay may correspond to a different format type than the image. The system applies a backend transformation of image characteristics of the graphic element to transform the display properties of the graphic element to correspond to the display properties of the image. Similarly, the system may detect a filter applied to an image. The filter may correspond to one format type and the image may be of a different format type. The system performs a backend conversion on the filter to match display properties of the filter to display properties of the target image.

Particular implementations provide at least the following advantages. When a user imports an image into an existing image-editing project in a GUI, the system performs a backend conversion to a particular display format. The system provides for different source image formats in the same project. In addition, the system provides a continuity of appearance among images of different formats, without requiring a user to manually adjust display characteristics to have the image match display characteristics of other images in the project.

Details of one or more implementations are set forth in the accompanying drawings and the description below. Other features, aspects, and potential advantages will be apparent from the description and drawings, and from the claims.

DESCRIPTION OF DRAWINGS

Like reference symbols in the various drawings indicate like elements.

DETAILED DESCRIPTION

First Element

Figure 1:
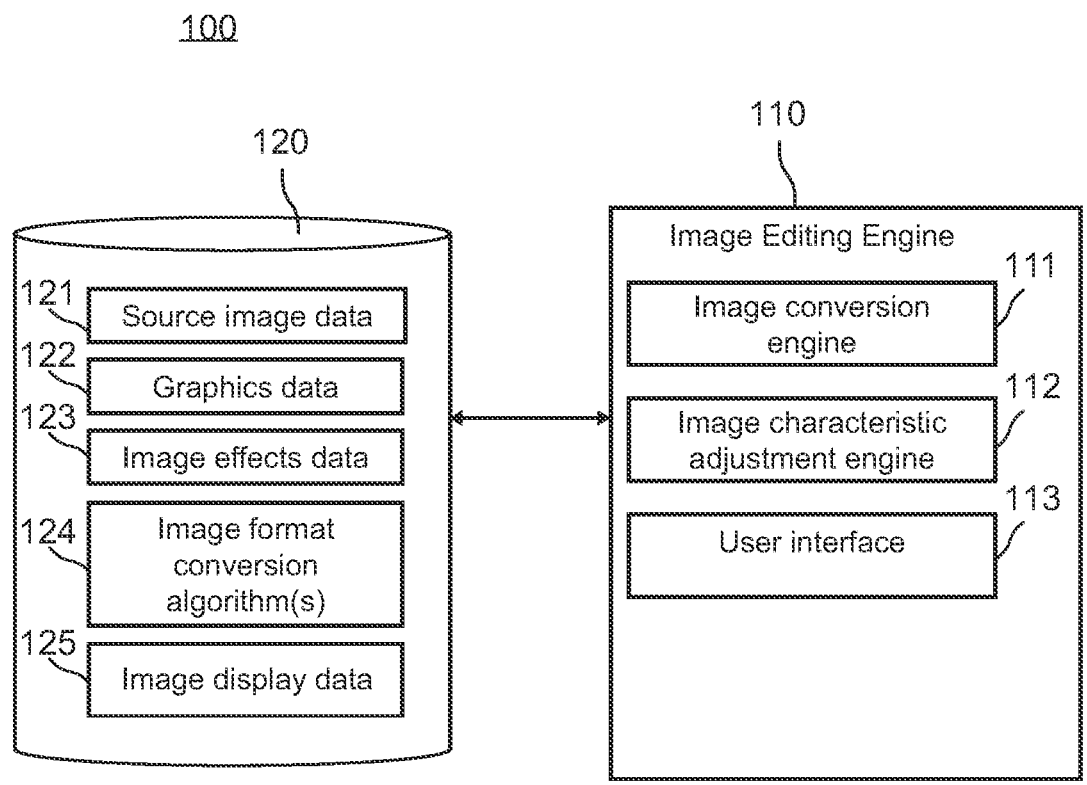
FIG. 1 is a block diagram of an example system for presenting a graphical user interface (GUI) that maintains a continuity of display characteristics between images of different display formats.

FIG. 1 is a block diagram of an example system 100 for presenting a graphical user interface (GUI) that maintains a continuity of display characteristics between images of different display formats. The system includes an image editing engine 110 and a data repository 120. The image editing engine 110 includes an image conversion engine 111, and image characteristic adjustment engine 112, and a user interface. The user interface 113 includes software elements and underlying hardware to process and display images, including still images and video.

The image editing engine 110 obtains a first set of source image data 121 to display on the graphical user interface. The first set of source image data 121 is in a particular format. Examples of image formats include standard dynamic range (SDR), high dynamic range (HDR), hybrid log-gamma (HLG), and perceptual quantizer (PQ). According to one example, the image editing engine 110 obtains the first set of source image data when a user opens a window in the GUI to select a file stored on a computer. In addition, or in the alternative, the image editing engine 110 may obtain the first set of source image data when a user drags-and-drops an icon representing an image file into a file-display region of the GUI.

The image editing engine 110 detects the format type of the source image data and generates a set of display data. The display data may correspond to the same format type or a different format type as the source image data. For example, in an embodiment in which the source image data is SDR data with a particular dynamic range, the image editing engine 110 may display the image in SDR. Alternatively, the image editing engine 110 may convert the SDR source image into an HDR format to display the image on the GUI as HDR, with a larger dynamic range than the SDR source image.

The image conversion engine 111 may apply a format conversion algorithm 124 to convert the source image data into the display data. The algorithm may take into account both a target image format with a target dynamic range and a dynamic range of a display device. For example, one display device may be capable of displaying only images with a smaller dynamic range and another display device may be capable of displaying images with a larger dynamic range. According to one embodiment, the image conversion engine 111 converts the source image content by tone-mapping the source image data to adjust brightness and color values to match those of an HDR display. The image conversion engine 111 then adds dynamic metadata to the SDR to tell the HDR display how to interpret the source image data. The image conversion engine 111 then generates display data 125 in a target format by compressing the image data using the bit depth and color gamut associated with the target image format.

The image editing engine 110 detects a user interaction with elements displayed on the GUI to modify image characteristics of a displayed image. According to one example, the GUI includes sliders which are movable by a user to adjust lighting and color characteristics of the displayed image. Some examples of adjustable characteristics include highlights, shadows, temperature, contrast, brightness, and saturation.

Based on a user input to the GUI, the image characteristic adjustment engine generates an adjustment value, or a set of adjustment values, for adjusting one or more image characteristics. For example, if the user moves a position of a "brightness" slider, the image characteristic adjustment engine 112 calculates a new set of brightness values for each of the colors red, green, and blue based on increasing each of the values or decreasing each of the values. If the user moves a position of a "temperature" slider, the image characteristic adjustment engine 112 calculates a new set of brightness values for each of the colors red, green, and blue based on changing a ratio of brightness between the red, green, and blue colors displayed in the image.

The image conversion engine 111 applies the calculated adjustment value to the conversion algorithm and the source image data to generate a modified set of display data 125. A user may load, insert, or select another image in the GUI. The second image may be of a different format than the first image. Based on detecting a user selection of the second image, the image characteristic adjustment engine 112 calculates an adjustment value based on the user interaction with an element (such as a slider) of the GUI corresponding to the first image. In other words, the GUI does not reset the image editing elements to modify image characteristics when a user selects a new image after editing a previous image. Instead, the image editing engine 110 applies the modifications to lighting and color from one image to a subsequently-selected image. If a user modifies a "black point" in one image of one format type, the image editing engine 110 applies the modification to a subsequently-selected image of a different format type. To apply the modification to the subsequent image, the image characteristic adjustment engine 112 calculates a set of adjustment values based on the user input and the source image type. The image conversion engine 111 applies the adjustment values and a conversion algorithm to the subsequent image to generate display data 125 to display the image.

According to one or more embodiments, the image editing engine 110 harmonizes output image properties displayed on a user interface 113 when a user displays two or more source images of different image formats in a same project field of the GUI. For example, a user may select two video clips having different video formats to be played consecutively in a composite video. The system converts the two separate video clips into a same display format, such that as the user is editing the video clips, the clips have the same dynamic ranges.

According to one or more embodiments, the system identifies different components within a displayed image, such as a source image and a graphic overlay. The system may detect graphics data 122 applied to an image or other effects data 123, such as image filter data. The system applies a separate conversion process to the separate components of the image. For example, a particular filter may be configured for use with HDR-type data. However, a user may select the filter to be applied to an SDR format source image. The system may convert characteristics of the filter to allow the filter to be used with the SDR-type image. Alternatively, the system may convert both the filter characteristics and the source image into another display format, such as a PQ-type format.

Example Processes

To enable the reader to obtain a clear understanding of the technological concepts described herein, the following processes describe specific steps performed in a specific order. However, one or more of the steps of a particular process may be rearranged and/or omitted while remaining within the contemplated scope of the technology disclosed herein. Moreover, different processes, and/or steps thereof, may be combined, recombined, rearranged, omitted, and/or executed in parallel to create different process flows that are also within the contemplated scope of the technology disclosed herein. Additionally, while the processes below may omit or briefly summarize some of the details of the technologies disclosed herein for clarity, the details described in the paragraphs above may be combined with the process steps described below to get a more complete and comprehensive understanding of these processes and the technologies disclosed herein.

Figure 2:
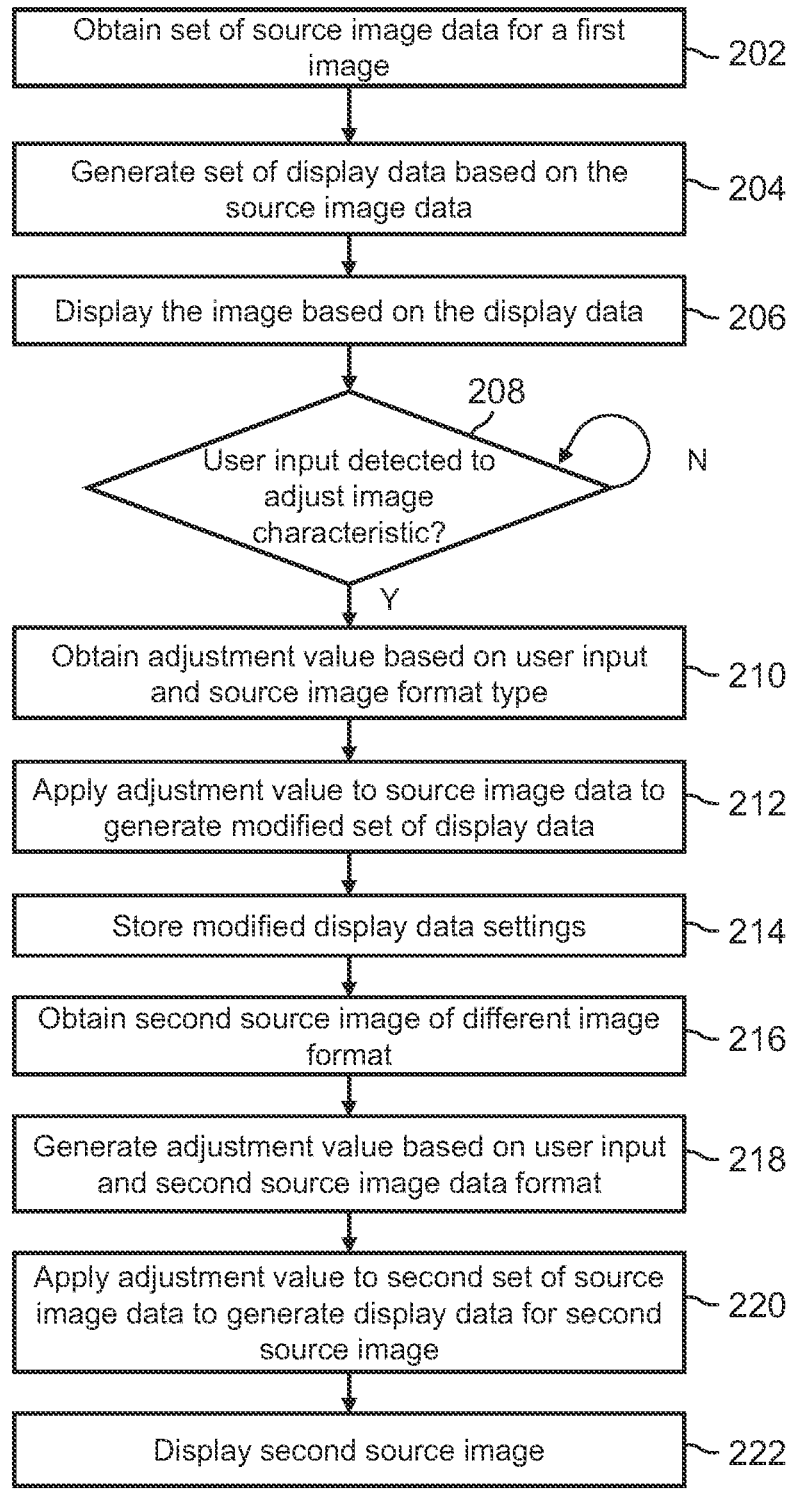
FIG. 2 is a flow diagram of an example process for harmonizing output image properties displayed on a user interface when a user switches between two or more source images of different image formats.

FIG. 2 is flow diagram of an example process for harmonizing output image properties displayed on a user interface when a user switches between two or more source images of different image formats.

A system obtains a set of source image data for a first image (Operation 202). The source image data corresponds to data in a particular format that may be converted into display data. The source image data corresponds to how light from image pixels is converted into stored digital data. The display data corresponds to how the stored digital data is converted into display pixels. Examples of image formats include standard dynamic range (SDR), high dynamic range (HDR), hybrid log-gamma (HLG), and perceptual quantizer (PQ). The system may obtain the set of source image data based on a user interacting with a graphical user interface (GUI). For example, the user may load a stored image into an imaging editing application.

The system generates a set of display data based on the source image data (Operation 204). The display data represents how the image will appear on a digital display. Generating the set of display data may include applying an algorithm to define a color space for the image. For example, an image that is stored in an SDR format typically has a peak brightness of 100 nits and a contrast ratio of 1000:1. The system may generate a set of display data to display the image with a peak brightness of 100 nits and a contrast ratio of 1000:1. Alternatively, the system may convert the SDR image data to display data corresponding to an HDR format, with a peak brightness of 1000 nits and a contrast ratio of 10,000:1. The algorithm for converting the source image data into the display data may take into account both a target dynamic range and a quality of a display device. For example, one display device may support a smaller dynamic range and another display device may support a larger dynamic range. For example, the system may convert the source image content by tone-mapping the source image data to adjust brightness and color values to match those of an HDR display. The system then adds dynamic metadata to the SDR to tell the HDR display how to interpret the source image data. The system then generates a data file in an HDR format by compressing the image data using the higher bit depth and the wider color gamut associated with the HDR-type format. The system generates display data corresponding to the smaller dynamic range for the former device and corresponding to the larger dynamic range for the latter device.

The system displays the image based on the set of display data (Operation 206). According to one embodiment, the system generates display data and displays an image based on a detected display type. For example, an application running on a device supporting an HDR display may generate HDR display data in a graphical user interface (GUI). An application running on a device supporting HLG or PQ may generate HLG or PQ display data, respectively, on the GUI.

The system determines whether a user input has been received to adjust an image characteristic (Operation 208). For example, a GUI may include sliders to adjust lighting and color characteristics of the image. Some examples of adjustable characteristics include highlights, shadows, temperature, contrast, brightness, and saturation.

Based on a user input to the GUI, the system obtains an adjustment value for adjusting an image characteristic (Operation 210). The system calculates the adjustment value based on (a) the user input, and (b) the source image format type. For example, the system may detect a user moved a "shadows" slider from one position to another. The system identifies the new position of the slider and determines how the position of the slider relates to the source image format type. For example, a source image type may be SDR, with a brightness level of up to 100 nits. Adjusting a slider may correspond to increasing a brightness of green color in a cluster of pixels in the image from 50 nits to 60 nits. Prior to the adjustment, the system generated the set of display data by applying a conversion algorithm to the source image data. Subsequent to the adjustment, the system generates the adjustment value, based on the change of brightness from 50 nits to 60 nits, for modifying the conversion algorithm to convert the source image data to the display data.

The system applies the calculated adjustment value to the source image data to generate a modified set of display data (Operation 212). In the example above, in which the source image data is SDR-type image data and the display data corresponds to HDR-type image data, the system generates the modified set of display data based on (a) the source image data, (b) the adjustment value, and (c) the conversion algorithm. For the particular cluster of pixels corresponding to the change in brightness from 50 to 60 nits, the system applies the adjustment value to the conversion algorithm to calculate the new brightness values, in an HDR dynamic range, for the cluster of pixels. For example, the brightness values in the HDR dynamic range may correspond to a change from 665 nits to 720 nits.

The system stores the modified display data settings (Operation 214).

The system obtains a second source image of a different format (Operation 216). For example, the first source image may be in an SDR format with a peak brightness of 100 nits and a contrast ratio of 1000:1. The second source image may be an HDR image with a peak brightness of 2000 nits and a contrast ratio of 12,000:1.

The system analyzes the stored display settings based on the previously-received user inputs adjusting image characteristics of the first image. The system generates a second adjustment value, or set of adjustment values, for the second image based on (a) the stored modified display settings, and (b) the image type of the second image (Operation 218). For example, if the first image is an SDR-type image, the second image is an HDR-type image with a dynamic range of 1,200 nits, and if the display is an HDR-type display capable of displaying a dynamic range of 1,000 nits, the system stores the display settings (Operation 214) corresponding to the modification of image characteristics and conversion of the SDR-type first source image to the 1,000 nit HDR display format. Upon receiving the second image, the system generates the second adjustment value for the 1,200 nit HDR-type image to apply to the conversion algorithm.

The system applies the second calculated adjustment value to the second set of source image data to generate a second modified set of display data for the second image (Operation 220). The second modified set of display data incorporates both the user input for modifying display characteristics of the first image and a conversion of the second image format to the display data format.

The system displays the second image (Operation 222). Since the second modified set of display data incorporates both the user input for modifying display characteristics of the first image and a conversion of the second image format to the display data format, the second image maintains a continuity of appearance with the first image. For example, a user may desire to include a set of images of different format types in a collage. The user may desire that all the images in the collage have the same look or style. The user may adjust image characteristics-such as exposure, tempera-ture, and contrast, of one image of one source format type. When the user loads another image of a different format type to display in a GUI, the GUI displays the new image (a) with the same display format type as the first image, and (b) with the image characteristic modifications implemented in the second image in such a way that the display maintains a continuity of appearance between the images, regardless of the source image type of the images.

According to one or more embodiments, maintaining modifications to a first image of a first format in a second image of a different format includes determining a set of adjustment values for changing a set of source brightness values to a set of modified brightness values based on a user interaction with a GUI interface element. When the system detects another image of another file type, the system calculates a second set of adjustment values to match the set of modified brightness values for the first image. The adjustment values for the first and second images may be calculated such that if the same image was provided in two different formats with two different dynamic ranges, and if a user modified one of the images, the system would calculate adjustment values for the other image such that the target brightness values for both images would be the same.

A detailed example is described below for purposes of clarity. Components and/or operations described below should be understood as one specific example which may not be applicable to certain embodiments. Accordingly, components and/or operations described below should not be construed as limiting the scope of any of the claims. FIGS. 3A, 3B, 3C, and 3D illustrate example embodiments of a user interface according to an embodiment. The graphical user interface (GUI) 301 displays an image 302 in one portion. The GUI 302 includes a region 303 including a set of sliders for adjusting image characteristics. Examples of adjustable characteristics include: exposure, contrast, brightness, saturation, and highlights. The GUI 301 includes a histogram 304 illustrating brightness levels of a color space of the image 302. For example, the histogram 304 shows a red, green, blue (RGB) color space for the image 302 that has a dynamic range or a range between a darkest pixel and a lightest pixel in the image data for the image 302, of 100 nit. Adjusting sliders in the region 303 results in adjusting brightness values for one or more RGB elements. For example, adjusting a "highlights" slider may cause the system to increase or decrease brightness levels only in the highest quartile of the dynamic range 305. Adjusting the "exposure" value may adjust the brightness level of the entire dynamic range 305. Adjusting a "warmth" slider may adjust a ratio of a brightness of red color pixels to green and blue color pixels.

Figure 3A:
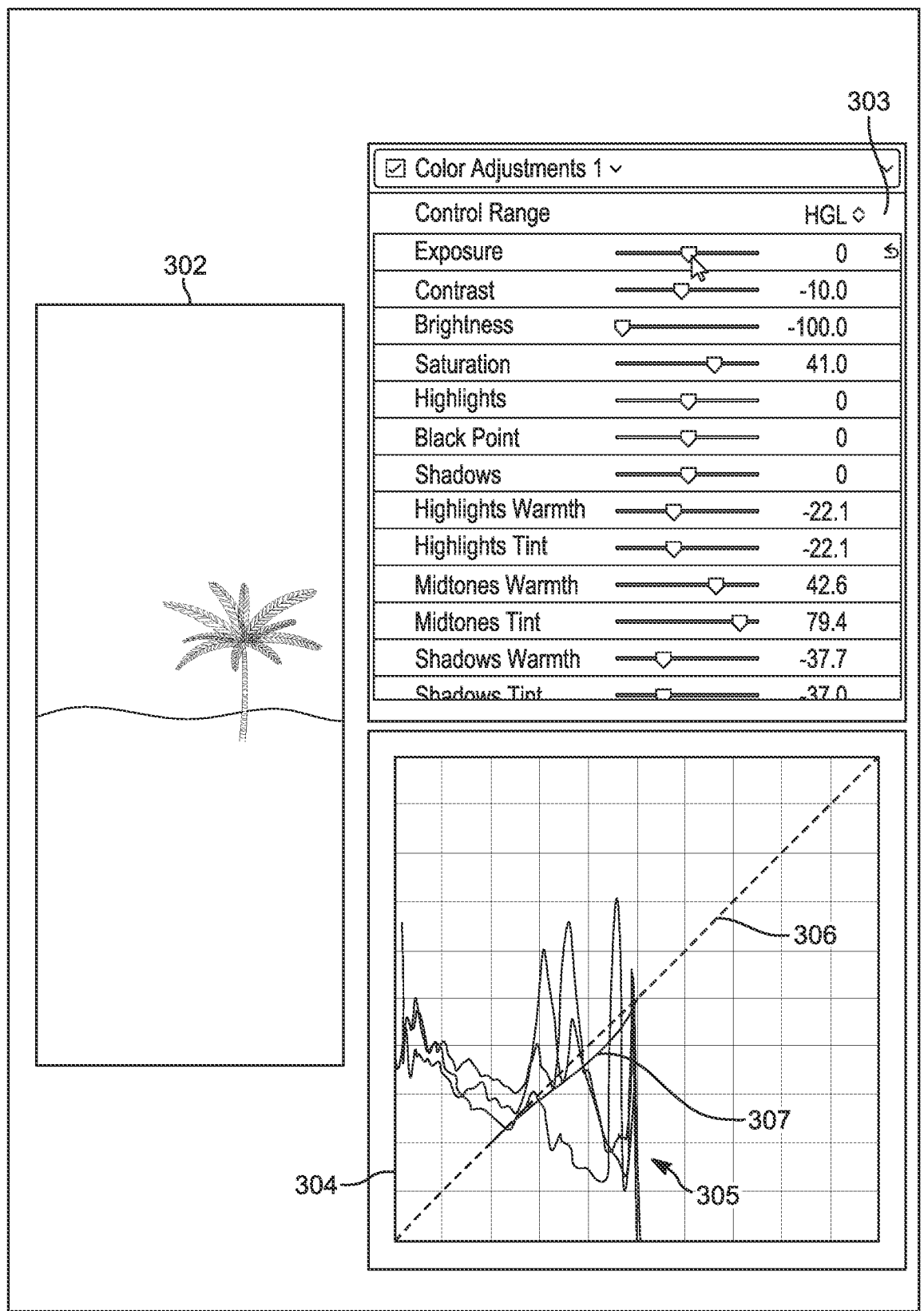
FIGS. 3A-3D illustrate example embodiments of a GUI for an application that maintains a continuity of display characteristics between images of different display formats.

The histogram 304 illustrated in FIG. 3A illustrates a dashed line 306 representing the unaltered display characteristics of the image 302. The solid line 307 represents modifications to one or more image characteristics, resulting in modifications to corresponding display characteristics.

Figure 3B:
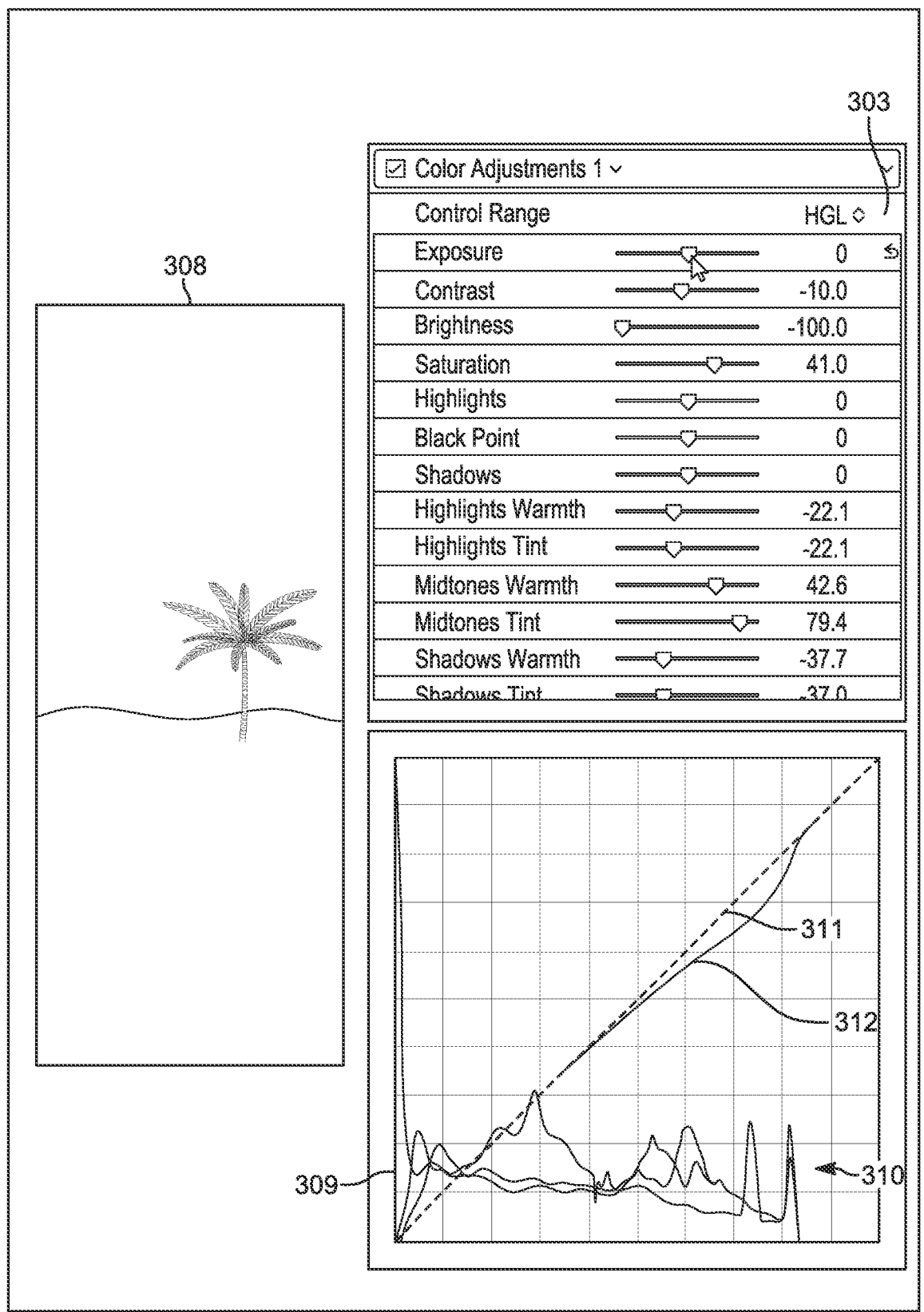

FIG. 3B illustrates the system applying the modified display data settings for the image 302 to the image 308 to maintain image display continuity between different images 302 and 308. When the system detects a new image 308, such as when a user selects the new image 308 to display in the GUI 301, the system (a) obtains the display settings applied to the image 302, and (b) obtains an adjustment value to convert the display settings from one format type to the format type associated with the new image. As illustrated in the histogram 309 for the image 308, the image 308 has a dynamic range 310 which exceeds the dynamic range 305 of the image 302. In the example illustrated in FIG. 3B, the image 308 has a dynamic range 310 of 1000 nit. The dashed line 311 represents the unaltered display characteristics of the image 308. The solid line 312 represents modifications to one or more image characteristics, resulting in modifications to corresponding display characteristics. As illustrated in FIGS. 3A and 3B, the same display settings, as indicated by the sliders in the region 303 correspond to modifications of different brightness values for the different images 302 and 308, as illustrated by the different locations of the curved portions of the lines 307 and 312 in FIGS. 3A and 3B. In other words, the system applies a different set of adjustments to the image data for the image 302 than for the image 308 to generate the different images 302 and 308 with consistent display attributes between the images, even though the displayed images 302 and 308 are generated from image data of different format types with different dynamic ranges. Accordingly, when the user switches between viewing the image 302 and the image 308, the user sees the images with similar display values-such as exposure and contrast-regardless of the dynamic range associated with the source image.

Figure 3C:
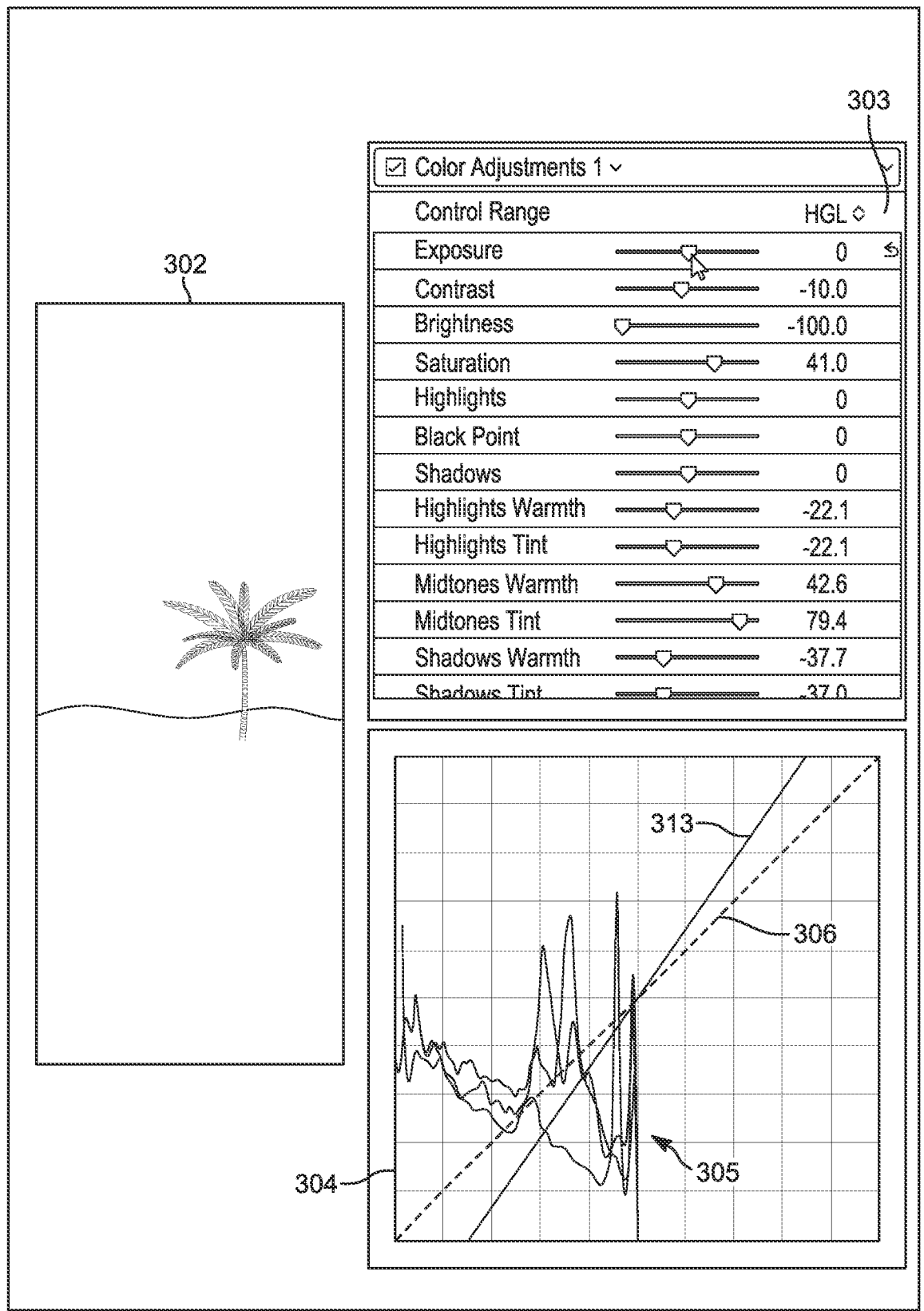
Figure 3D:
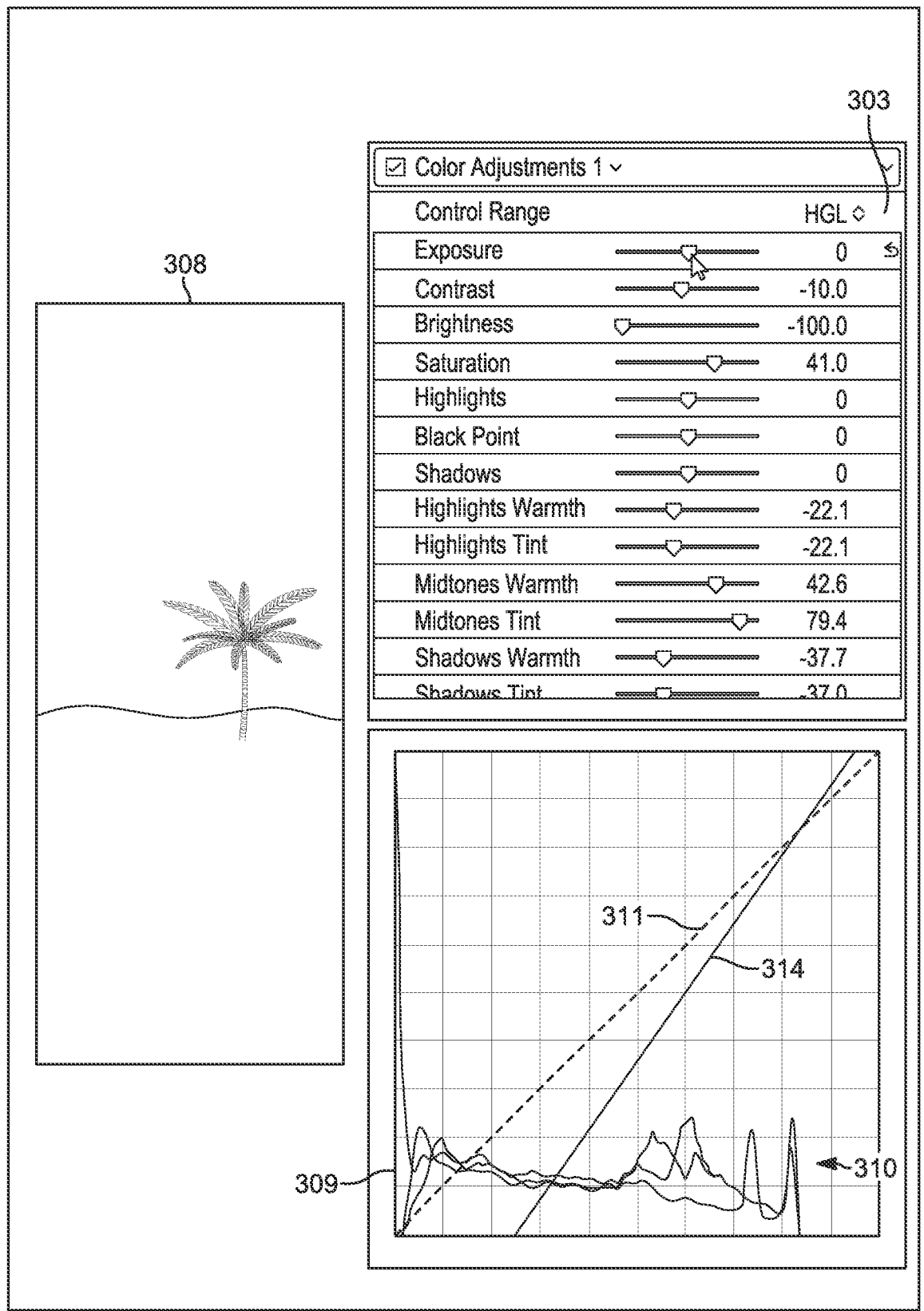

Referring to FIGS. 3C and 3D, the histogram 304 illustrated in FIG. 3C illustrates a dashed line 306 representing the unaltered display characteristics of the image 302. The solid line 313 represents modifications to a "black point" display characteristic, resulting in modifications to the entire set of brightness values for the image data of the image 302.

FIG. 3D illustrates the system converting the modified display data settings for the image 302 to the image type of the image 308 to maintain image display continuity between different images 302 and 308. The solid line 314 represents modifications to the entire set of brightness values for the image data of the image 308 corresponding to the position of the "black point" slider in the region 303. As illustrated in FIGS. 3C and 3D, the same display settings, as indicated by position of the "black point" slider in the region 303 correspond to the system applying different modifications to the brightness values for the different images 302 and 308, as illustrated by the different locations of the solid lines 307 and 312 in the histograms 304 and 309. In other words, the system applies a different set of adjustments to the image data for the image 302 than for the image 308 to generate the different images 302 and 308 with consistent display attributes between the images, even though the displayed images 302 and 308 are generated from image data of different format types with different dynamic ranges. Accordingly, when the user switches between viewing the image 302 and the image 308, the user sees the images with similar display values—such as a similar black point—regardless of the dynamic range associated with the source image.

Figure 4:
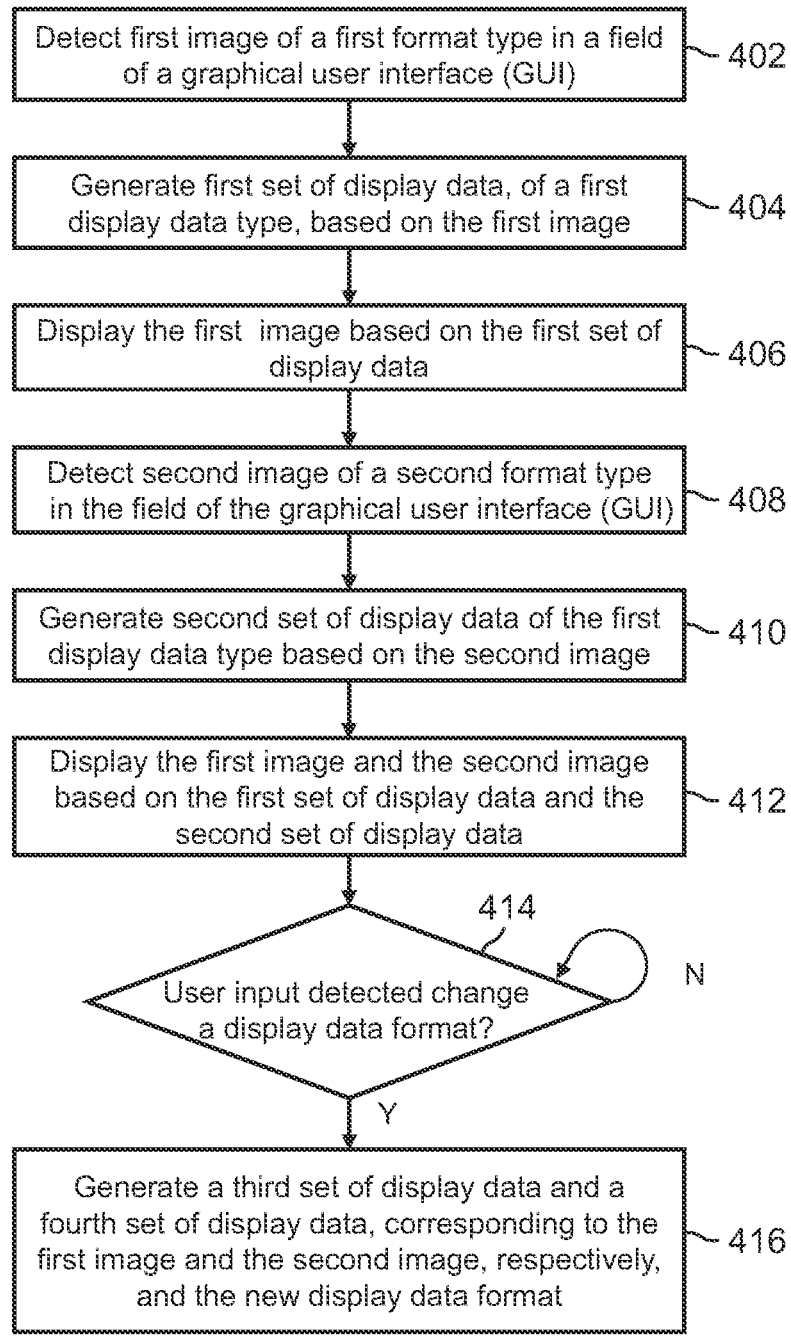
FIG. 4 is flow diagram of an example process for harmonizing output image properties displayed on a user interface when a user displays two or more source images of different image formats in a same project region.

FIG. 4 is flow diagram of an example process for harmonizing output image properties displayed on a user interface when a user displays two or more source images of different image formats in a same project region.

A system detects a first image of a first format type in a field of a graphical user interface (GUI) (Operation 402). The field performs a function of displaying icons associated with one or more image files or video files to be included in an image/video project. For example, the field may be a timeline field into which a user may drag-and-drop, edit, and select video files to be included in a combined video file. While their icons are displayed in the GUI field, images or video clips are stored separately. A user may view and modify one image and/or video clip separately from other images and/or video clips. Examples of image formats include standard dynamic range (SDR), high dynamic range (HDR), hybrid log-gamma (HLG), and perceptual quantizer (PQ).

The system generates a first set of display data, of a first display data type, based on the first image (Operation 404). For example, a user may desire to generate an HDR format video. However, the user may provide an SDR format source video. The system generates the first set of display data by converting the SDR video to an HDR format. The first display type may be selected by a user, or may be identified by one or more alternative methods. For example, a system may identify the format types of each video clip in a timeline field. The system may identify a format of a video clip with the highest dynamic range. The system may convert each other video clip in the field to the particular format with the highest dynamic range. Alternatively, the system may convert images and/or videos to a default format. For example, the system may be configured to operate on images/videos of an HLG format. Accordingly, the system may convert any non-HLG-type images/videos into an HLG format.

The system displays the first image based on the first set of display data (Operation 406). The system displays an image or a frame from a video in a window of the GUI separate from the field in which an icon associated with an image or video clip is displayed. For example, a user may select a tile in the field representing a video clip and the system displays a frame corresponding to the video clip in a large window of the GUI. The tile or icon is smaller and has a lower resolution than the displayed image in the larger display region of the GUI. The tile or icon may be a clip displayed at a low resolution, while the GUI displays the image at a higher, target resolution in a main window of the GUI.

The system detects a second image of a second format type in the field (Operation 408). For example, a user may load a second video clip into the timeline field of the GUI. The first video may be an SDR format video, and the second video may be an HDR format video. According to another example, the field is an album for still images. The system detects a still image of a new format being uploaded or dragged-and-dropped into the field.

The system generates a second set of display data of the first display data type based on the second image (Operation 410). According to one embodiment, if the system detects a user made changes to image characteristics of the first image, the system may apply the changes to the second image. For example, if the user altered a "temperature" setting of the first image, the system may apply the altered temperature setting to the second image.

The system displays the first image and the second image based on the first set of display data and the second set of display data (Operation 412). In an example embodiment in which the first image and the second image are video clips, the system plays a video including the two video clips in a same video format. For example, one clip may be stored as an SDR clip. Another may be stored as an HLG clip. The system may be configured to display video in an HDR format. The system, as noted previously, converts the two clips to HDR and plays the two clips in the HDR format. In an example embodiment in which the images are still images, the system may display two images simultaneously in the same format, such as HDR.

The system determines whether a user input is detected to change a display data format (Operation 414). For example, a GUI may include a drop down menu with which a user may select different display formats. A user may select to convert a set of images and/or videos between an SDR format, an HDR format, an HLG format, a PQ format, or any other type of image and/or video format.

Based on detecting the user input to change the display data format, the system generates a third set of display data and a fourth set of display data, corresponding to the first image and the second image, respectively, in the new display format (Operation 416). The system may display tiles representing the first image and the second image in the field in one format, such as an SDR format. However, when the images are displayed in the main display window of the GUI, the images may be displayed in a selected format. If the system detects a user selection to change the format of the images represented in the field from one HDR format to a PQ format, the system converts the images into a PQ format for display in the main display window of the GUI. For example, in an embodiment in which the images are video images, the system stores and displays the videos in the PQ format.

According to one example embodiment, the system identifies different visual components within an image and applies separate format conversion processed on the different visual components. For example, a user may apply a graphic overlay to a video. The source video format may be SDR and the graphic overlay may be in a native HDR format. The system may be configured to display video in an HLG format. Accordingly, the system performs one conversion process to convert the SDR video to HLG format for display. The system performs another conversion process to convert the graphic overlay to the HLG format.

According to another example embodiment, the system modifies an image filter to correspond to a display data format. For example, a user may have an HDR format image. The user may want to apply a filter to the image. However, the filter may be designed for use with SDR images having a smaller dynamic range than the HDR image. Based on detecting a user selection of the filter, the system converts the parameters of the filter for use with the HDR format image. In addition, the image and the corresponding filter may be further converted to a particular display data format. According to one embodiment, the system applies the modified filter to the source image prior to converting the source image and the filter into a target image format for an image/video project. According to an alternative embodiment, the system first converts an image to a target format for a project, converts the filter for use with the target format for the project, and then applies the converted filter to the converted image.

Figure 5:
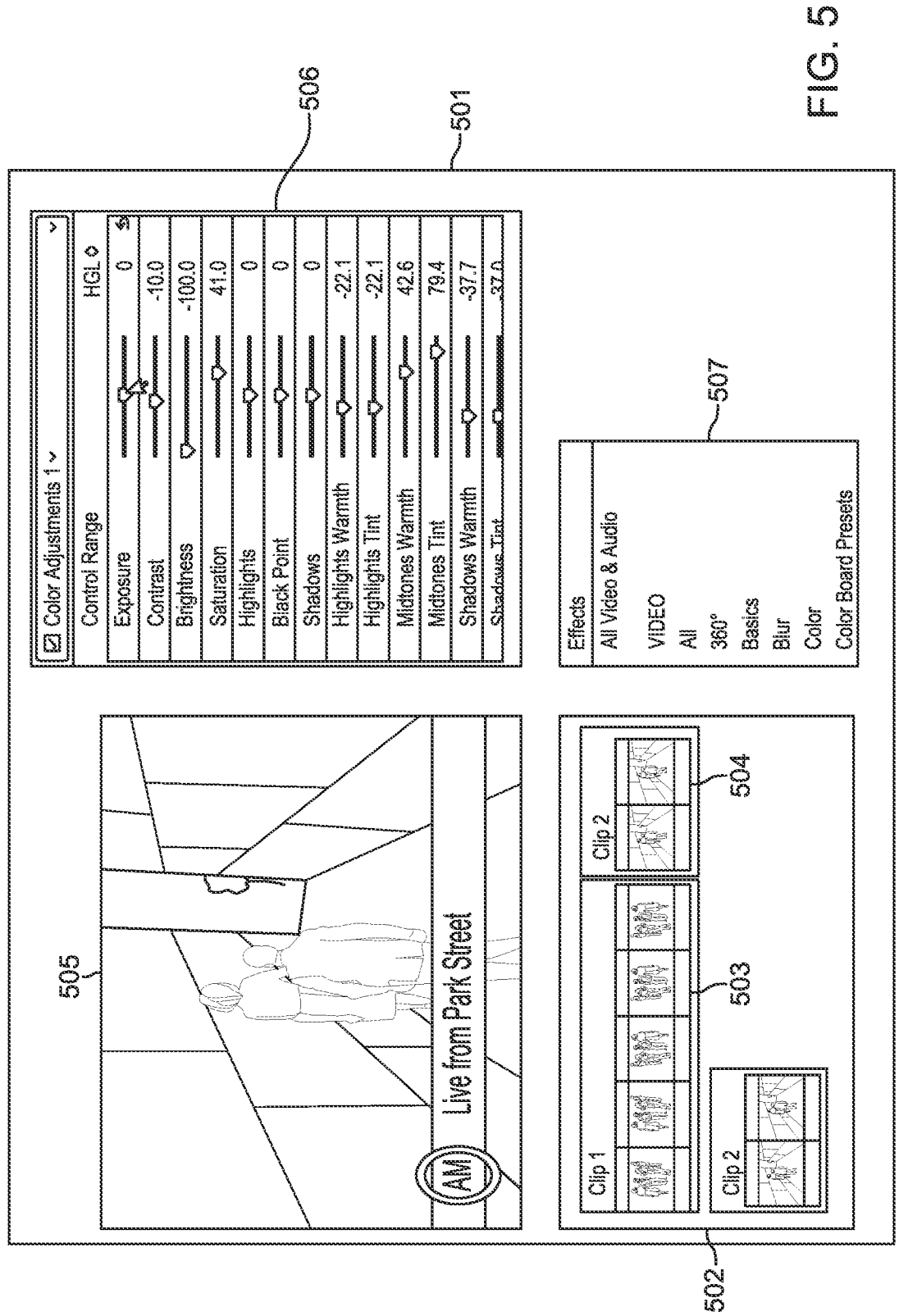
FIG. 5 illustrates an example embodiment of a GUI for an application that harmonizes output image properties displayed on a user interface of two or more images of different image formats.

A detailed example is described below for purposes of clarity. Components and/or operations described below should be understood as one specific example which may not be applicable to certain embodiments. Accordingly, components and/or operations described below should not be construed as limiting the scope of any of the claims. FIG. 5 illustrates an example embodiment of a user interface. The graphical user interface (GUI) 501 displays an image 505 in a main display portion of the GUI 501. In the example of FIG. 5, the image 505 includes a source image of individuals and a graphic component overlaid onto the source image. The GUI 501 includes an image adjustment region 506 including a set of sliders for adjusting image characteristics. Examples of adjustable characteristics include: exposure, contrast, brightness, saturation, and highlights. The GUI 501 includes a timeline field 502 in which the GUI displays selected video clips 503 and 504 to be included in a composite video. An effects menu 507 displays a list of effects a user may apply to a particular video clip.

The GUI 501 of FIG. 5 is initially set to display the image 505 in an HLG video format. The clip 503 is an SDR video format and the clip 504 is an HDR video format with a dynamic range that is different from the HLG video format. The system converts the image data for the video clips 503 and 504 into the HDR format for display in the main display region of the GUI 501. In addition, the system detects the presence of the graphic element in the clip 504. The system determines that the graphic element is in an HDR video format. Based on determining the HDR format of the graphic element is the target format, the system refrains from performing any conversion on the graphic element.

The system detects a user input to convert the clips 503 and 504 into a perceptual quantization (PQ) format for display. Based on the user input, the system converts the source image data for the clips 503 and 504 into a PQ format. The system also converts the graphic overlay element into the PQ format. The system further detects a user input to apply a "blur" type effect to the clip 503. However, the blur type effect may be configured for use with SDR format video. Accordingly, the system modifies the parameters of the blur effect to correspond to the target, PQ-type, format. The system then applies the blur effect to the clip 503.

According to the example embodiment, the system maintains display continuity between images and/or videos of different format types with different dynamic ranges. The system converts different images and/or video clips with tiles in a particular GUI field into a target display format. If a user or application changes a target display format, the system changes the display format for each image/video represented in the GUI field. The system identifies different image elements, such as overlay elements, in an image and converts each separate element into a target format according to its source format. The system further converts filters for modifying display characteristics according to a target image format.

Graphical User Interfaces

This disclosure above describes various Graphical User Interfaces (GUIs) for implementing various features, processes or workflows. These GUIs can be presented on a variety of electronic devices including but not limited to laptop computers, desktop computers, computer terminals, television systems, tablet computers, e-book readers and smart phones. One or more of these electronic devices can include a touch-sensitive surface. The touch-sensitive surface can process multiple simultaneous points of input, including processing data related to the pressure, degree or position of each point of input. Such processing can facilitate gestures with multiple fingers, including pinching and swiping.

When the disclosure refers to "select" or "selecting" user interface elements in a GUI, these terms are understood to include clicking or "hovering" with a mouse or other input device over a user interface element, or touching, tapping or gesturing with one or more fingers or stylus on a user interface element. User interface elements can be virtual buttons, menus, selectors, switches, sliders, scrubbers, knobs, thumbnails, links, icons, radio buttons, checkboxes and any other mechanism for receiving input from, or providing feedback to a user.

Privacy

As described above, one aspect of the present technology is the gathering and use of data available from various sources to [improve the delivery to users of invitational content or any other content that may be of interest to them]. The present disclosure contemplates that in some instances, this gathered data may include personal information data that uniquely identifies or can be used to contact or locate a specific person. Such personal information data can include demographic data, location-based data, telephone numbers, email addresses, twitter ID's, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to [deliver targeted content that is of greater interest to the user. Accordingly, use of such personal information data enables users to calculated control of the delivered content.] Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, [in the case of advertisement delivery services], the present technology can be configured to allow users to select to "opt in" or "opt out" of participation in the collection of personal information data during registration for services or anytime thereafter. [In another example, users can select not to provide mood-associated data for targeted content delivery services. In yet another example, users can select to limit the length of time mood-associated data is maintained or entirely prohibit the development of a baseline mood profile]. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, [content can be selected and delivered to users by inferring preferences] based on non-personal information data or a bare minimum amount of personal information, such as the content being requested by the device associated with a user, other non-personal information available to the [content delivery services], or publicly available information.

Example System Architecture

Figure 6:
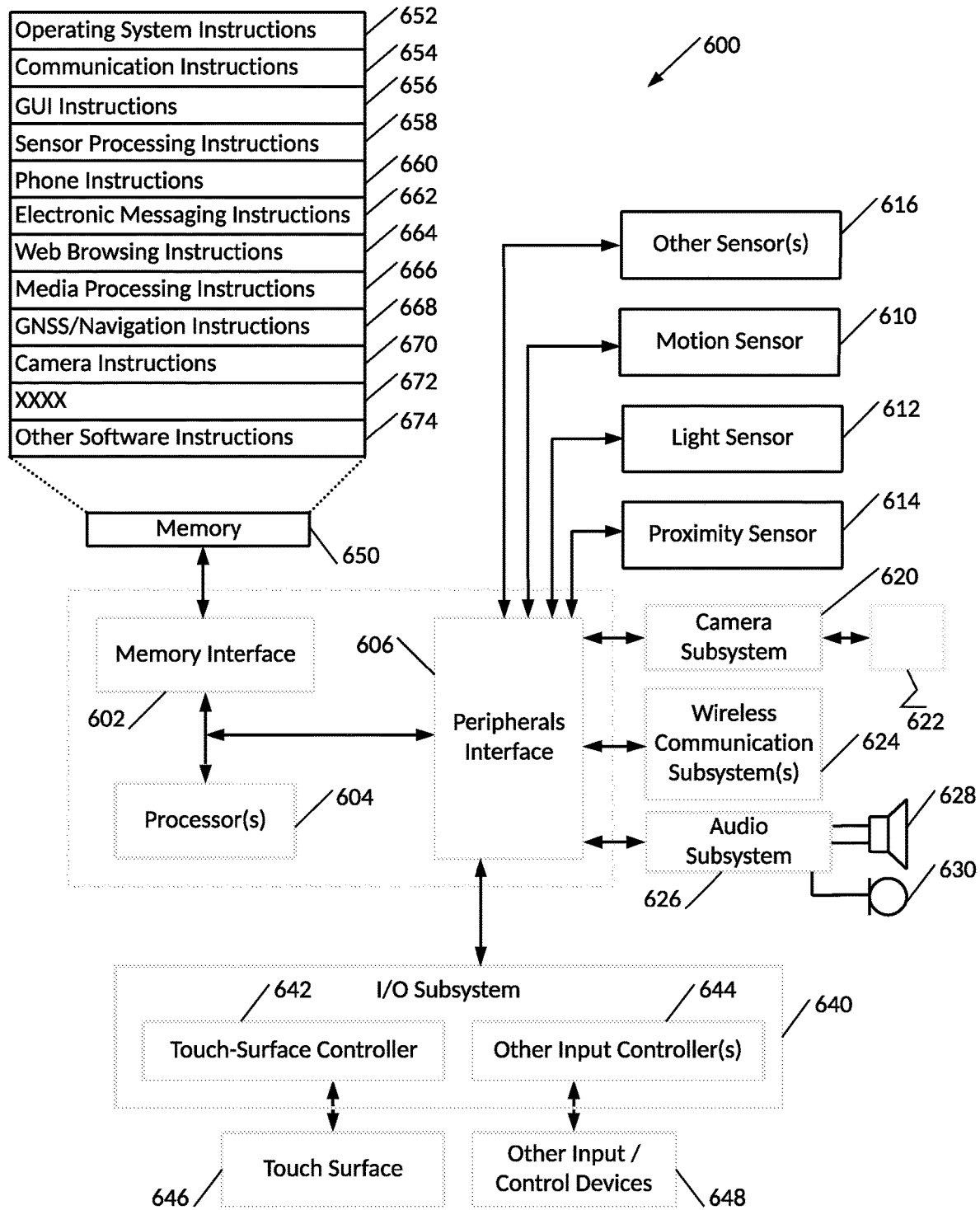
FIG. 6 is a block diagram of an example computing device that can implement the features and processes of FIGS. 1-5.

FIG. 6 is a block diagram of an example computing device 600 that can implement the features and processes of FIGS. 1-5. The computing device 600 can include a memory interface 602, one or more data processors, image processors and/or central processing units 604, and a peripherals interface 606. The memory interface 602, the one or more processors 604 and/or the peripherals interface 606 can be separate components or can be integrated in one or more integrated circuits. The various components in the computing device 600 can be coupled by one or more communication buses or signal lines.

Sensors, devices, and subsystems can be coupled to the peripherals interface 606 to facilitate multiple functionalities. For example, a motion sensor 610, a light sensor 612, and a proximity sensor 614 can be coupled to the peripherals interface 606 to facilitate orientation, lighting, and proximity functions. Other sensors 616 can also be connected to the peripherals interface 606, such as a global navigation satellite system (GNSS) (e.g., GPS receiver), a temperature sensor, a biometric sensor, magnetometer or other sensing device, to facilitate related functionalities.

A camera subsystem 620 and an optical sensor 622, e.g., a charged coupled device (CCD) or a complementary metal-oxide semiconductor (CMOS) optical sensor, can be utilized to facilitate camera functions, such as recording photographs and video clips. The camera subsystem 620 and the optical sensor 622 can be used to collect images of a user to be used during authentication of a user, e.g., by performing facial recognition analysis.

Communication functions can be facilitated through one or more wireless communication subsystems 624, which can include radio frequency receivers and transmitters and/or optical (e.g., infrared) receivers and transmitters. The specific design and implementation of the communication subsystem 624 can depend on the communication network(s) over which the computing device 600 is intended to operate. For example, the computing device 600 can include communication subsystems 624 designed to operate over a GSM network, a GPRS network, an EDGE network, a Wi-Fi or WiMax network, and a Bluetooth™ network. In particular, the wireless communication subsystems 624 can include hosting protocols such that the device 600 can be configured as a base station for other wireless devices.

An audio subsystem 626 can be coupled to a speaker 628 and a microphone 630 to facilitate voice-enabled functions, such as speaker recognition, voice replication, digital recording, and telephony functions. The audio subsystem 626 can be configured to facilitate processing voice commands, voiceprinting and voice authentication, for example.

The I/O subsystem 640 can include a touch-surface controller 642 and/or other input controller(s) 644. The touch-surface controller 642 can be coupled to a touch surface 646. The touch surface 646 and touch-surface controller 642 can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch surface 646.

The other input controller(s) 644 can be coupled to other input/control devices 648, such as one or more buttons, rocker switches, thumb-wheel, infrared port, USB port, and/or a pointer device such as a stylus. The one or more buttons (not shown) can include an up/down button for volume control of the speaker 628 and/or the microphone 630.

In one implementation, a pressing of the button for a first duration can disengage a lock of the touch surface 646; and a pressing of the button for a second duration that is longer than the first duration can turn power to the computing device 600 on or off. Pressing the button for a third duration can activate a voice control, or voice command, module that enables the user to speak commands into the microphone 630 to cause the device to execute the spoken command. The user can customize a functionality of one or more of the buttons. The touch surface 646 can, for example, also be used to implement virtual or soft buttons and/or a keyboard.

In some implementations, the computing device 600 can present recorded audio and/or video files, such as MP3, AAC, and MPEG files. In some implementations, the computing device 600 can include the functionality of an MP3 player, such as an iPod™.

The memory interface 602 can be coupled to memory 650. The memory 650 can include high-speed random-access memory and/or non-volatile memory, such as one or more magnetic disk storage devices, one or more optical storage devices, and/or flash memory (e.g., NAND, NOR). The memory 650 can store an operating system 652, such as Darwin, RTXC, LINUX, UNIX, OS X, WINDOWS, or an embedded operating system such as Vx Works.

The operating system 652 can include instructions for handling basic system services and for performing hardware dependent tasks. In some implementations, the operating system 652 can be a kernel (e.g., UNIX kernel). In some implementations, the operating system 652 can include instructions for running applications that perform harmonization among display characteristics for source images of different format types. For example, operating system 652 can implement features as described with reference to FIGS. 1-5 to run applications for displaying and editing image data.

The memory 650 can also store communication instructions 654 to facilitate communicating with one or more additional devices, one or more computers and/or one or more servers. The memory 650 can include graphical user interface instructions 656 to facilitate graphic user interface processing; sensor processing instructions 658 to facilitate sensor-related processing and functions; phone instructions 660 to facilitate phone-related processes and functions; electronic messaging instructions 662 to facilitate electronic-messaging related processes and functions; web browsing instructions 664 to facilitate web browsing-related processes and functions; media processing instructions 666 to facilitate media processing-related processes and functions; GNSS/Navigation instructions 668 to facilitate GNSS and navigation-related processes and instructions; and/or camera instructions 670 to facilitate camera-related processes and functions.

The memory 650 can store software instructions 672 to facilitate other processes and functions, such as the image display and editing processes and functions as described with reference to FIGS. 1-5.

The memory 650 can also store other software instructions 674, such as web video instructions to facilitate web video-related processes and functions; and/or web shopping instructions to facilitate web shopping-related processes and functions. In some implementations, the media processing instructions 666 are divided into audio processing instructions and video processing instructions to facilitate audio processing-related processes and functions and video processing-related processes and functions, respectively.

Each of the above identified instructions and applications can correspond to a set of instructions for performing one or more functions described above. These instructions need not be implemented as separate software programs, procedures, or modules. The memory 650 can include additional instructions or fewer instructions. Furthermore, various functions of the computing device 600 can be implemented in hardware and/or in software, including in one or more signal processing and/or application specific integrated circuits.

To aid the Patent Office and any readers of any patent issued on this application in interpreting the claims appended hereto, applicants wish to note that they do not intend any of the appended claims or claim elements to invoke 35 U.S.C. 112(f) unless the words "means for" or "step for" are explicitly used in the particular claim.

What is claimed is:
1. A method comprising:
  accessing, by a computing device, a first image of a first image type, the first image type corresponding to a first dynamic range for a set of image characteristics, wherein the first image corresponds to a first set of values, within the first dynamic range, for the set of image characteristics;
  based on the first set of values, generating, by the computing device, a first set of display values for displaying, by a graphical user interface (GUI), the first image;
  displaying the first image in the GUI according to the first set of display values;

receiving, by the computing device, a user input to modify at least a first value for a particular image characteristic from among the set of image characteristics;

responsive to receiving the user input, generating, by the computing device, a second image at least by:

calculating a first adjustment value based on (a) the first image type, and (b) the user input;

applying the first adjustment value to the first set of values for the set of image characteristics to generate a second set of display values for displaying the second image; and displaying the second image in the GUI according to the second set of display values;

accessing, by the computing device, a third image of a second image type, the second image type corresponding to a second dynamic range for the set of image characteristics, wherein the second dynamic range is different from the first dynamic range, and wherein the third image corresponds to a second set of values, within the second dynamic range, for the set of image characteristics;

generating, by the computing device, a fourth image at least by:

calculating a second adjustment value based on (a) the second image type and (b) the user input; and applying the second adjustment value to the second set of values for the set of image characteristics to generate a third set of display values for displaying the fourth image; and displaying, by the GUI, the fourth image characterized by the third set of display values.

2. The method of claim 1, wherein the GUI includes a slider user interface element movable by a user to adjust the particular image characteristic, and wherein the user input comprises moving the slider from a first position to a second position on the GUI.

3. The method of claim 2, wherein the user input comprises:

a first instance of a user moving the slider to the second position while displaying the first image in the GUI; and a second instance of a user moving the slider to the second position while displaying the second image in the GUI.

4. The method of claim 2, wherein the first adjustment value is calculated based, in part, on a location of the slider in the GUI.

5. The method of claim 1, further comprising:

based on determining the first image is of a first image type, applying a first adjustment formula to calculate the first adjustment value;

based on determining the second image is of a second image type, applying a second adjustment formula to calculate the second adjustment value.

6. The method of claim 1, wherein the first set of values includes a plurality of brightness values for a plurality of colors, wherein a first set of maximum color brightness values among the first set of values is greater than a second set of maximum color brightness values among the second set of values.

7. The method of claim 1, wherein the first adjustment value includes a first set of brightness adjustment values for a plurality of colors, and wherein the second adjustment value includes a second set of brightness adjustment values, different from the first set of brightness adjustment values, for the plurality of colors.

8. The method of claim 1, wherein the image characteristics include shadows, brightness, and highlights.

9. The method of claim 1, wherein the second dynamic range is smaller than the first dynamic range.

10. The method of claim 1, wherein the first dynamic range corresponds to a perceived quantization (PQ) image format, and wherein the second dynamic range corresponds to a standard dynamic range (SDR) image format.

11. A non-transitory computer-readable medium including one or more sequences of instructions that, when executed by one or more processors, cause the processors to perform operations comprising:

accessing a first image of a first image type, the first image type corresponding to a first dynamic range for a set of image characteristics, wherein the first image corresponds to a first set of values, within the first dynamic range, for the set of image characteristics;

based on the first set of values, generating a first set of display values for displaying, by a graphical user interface (GUI), the first image;

displaying the first image in the GUI according to the first set of display values;

receiving a user input to modify at least a first value for a particular image characteristic from among the set of image characteristics;

responsive to receiving the user input, generating a second image at least by:

calculating a first adjustment value based on (a) the first image type, and (b) the user input;

applying the first adjustment value to the first set of values for the set of image characteristics to generate a second set of display values for displaying the second image; and displaying the second image in the GUI according to the second set of display values;

accessing a third image of a second image type, the second image type corresponding to a second dynamic range for the set of image characteristics, wherein the second dynamic range is different from the first dynamic range, and wherein the third image corresponds to a second set of values, within the second dynamic range, for the set of image characteristics;

generating a fourth image at least by:

calculating a second adjustment value based on (a) the second image type and (b) the user input; and applying the second adjustment value to the second set of values for the set of image characteristics to generate a third set of display values for displaying the fourth image; and displaying, by the GUI, the fourth image characterized by the third set of display values.

12. The non-transitory computer-readable medium of claim 11, wherein the GUI includes a slider user interface element movable by a user to adjust the particular image characteristic, and wherein the user input comprises moving the slider from a first position to a second position on the GUI.

13. The non-transitory computer-readable medium of claim 12, wherein the user input comprises:

a first instance of a user moving the slider to the second position while displaying the first image in the GUI; and a second instance of a user moving the slider to the second position while displaying the second image in the GUI.

14. The non-transitory computer-readable medium of claim 12, wherein the first adjustment value is calculated based, in part, on a location of the slider in the GUI.

15. The non-transitory computer-readable medium of claim 11, wherein the operations further comprise:
- based on determining the first image is of a first image type, applying a first adjustment formula to calculate the first adjustment value;
- based on determining the second image is of a second image type, applying a second adjustment formula to calculate the second adjustment value.

16. The non-transitory computer-readable medium of claim 11, wherein the first set of values includes a plurality of brightness values for a plurality of colors,
- wherein a first set of maximum color brightness values among the first set of values is greater than a second set of maximum color brightness values among the second set of values.

17. The non-transitory computer-readable medium of claim 11, wherein the first adjustment value includes a first set of brightness adjustment values for a plurality of colors, and
- wherein the second adjustment value includes a second set of brightness adjustment values, different from the first set of brightness adjustment values, for the plurality of colors.

18. The non-transitory computer-readable medium of claim 11, wherein the image characteristics include shadows, brightness, and highlights.

19. The non-transitory computer-readable medium of claim 11, wherein the second dynamic range is smaller than the first dynamic range.

20. A system comprising:
- one or more processors; and
- a non-transitory computer-readable medium including one or more sequences of instructions that, when executed by one or more processors, cause the processors to perform operations comprising:
  - accessing a first image of a first image type, the first image type corresponding to a first dynamic range for a set of image characteristics, wherein the first image corresponds to a first set of values, within the first dynamic range, for the set of image characteristics;
  - based on the first set of values, generating a first set of display values for displaying, by a graphical user interface (GUI), the first image;
  - displaying the first image in the GUI according to the first set of display values;
  - receiving a user input to modify at least a first value for a particular image characteristic from among the set of image characteristics;
  - responsive to receiving the user input, generating a second image at least by:
    - calculating a first adjustment value based on (a) the first image type, and (b) the user input;
    - applying the first adjustment value to the first set of values for the set of image characteristics to generate a second set of display values for displaying the second image; and
    - displaying the second image in the GUI according to the second set of display values;
  - accessing a third image of a second image type, the second image type corresponding to a second dynamic range for the set of image characteristics, wherein the second dynamic range is different from the first dynamic range, and wherein the third image corresponds to a second set of values, within the second dynamic range, for the set of image characteristics;
  - generating a fourth image at least by:
    - calculating a second adjustment value based on (a) the second image type and (b) the user input; and
    - applying the second adjustment value to the second set of values for the set of image characteristics to generate a third set of display values for displaying the fourth image; and
  - displaying, by the GUI, the fourth image characterized by the third set of display values.

\* \* \* \* \*